May 12, 1931. E. VAN HORN 1,804,572
AEROPLANE LANDING LIGHT
Filed Nov. 20, 1929 3 Sheets-Sheet 2

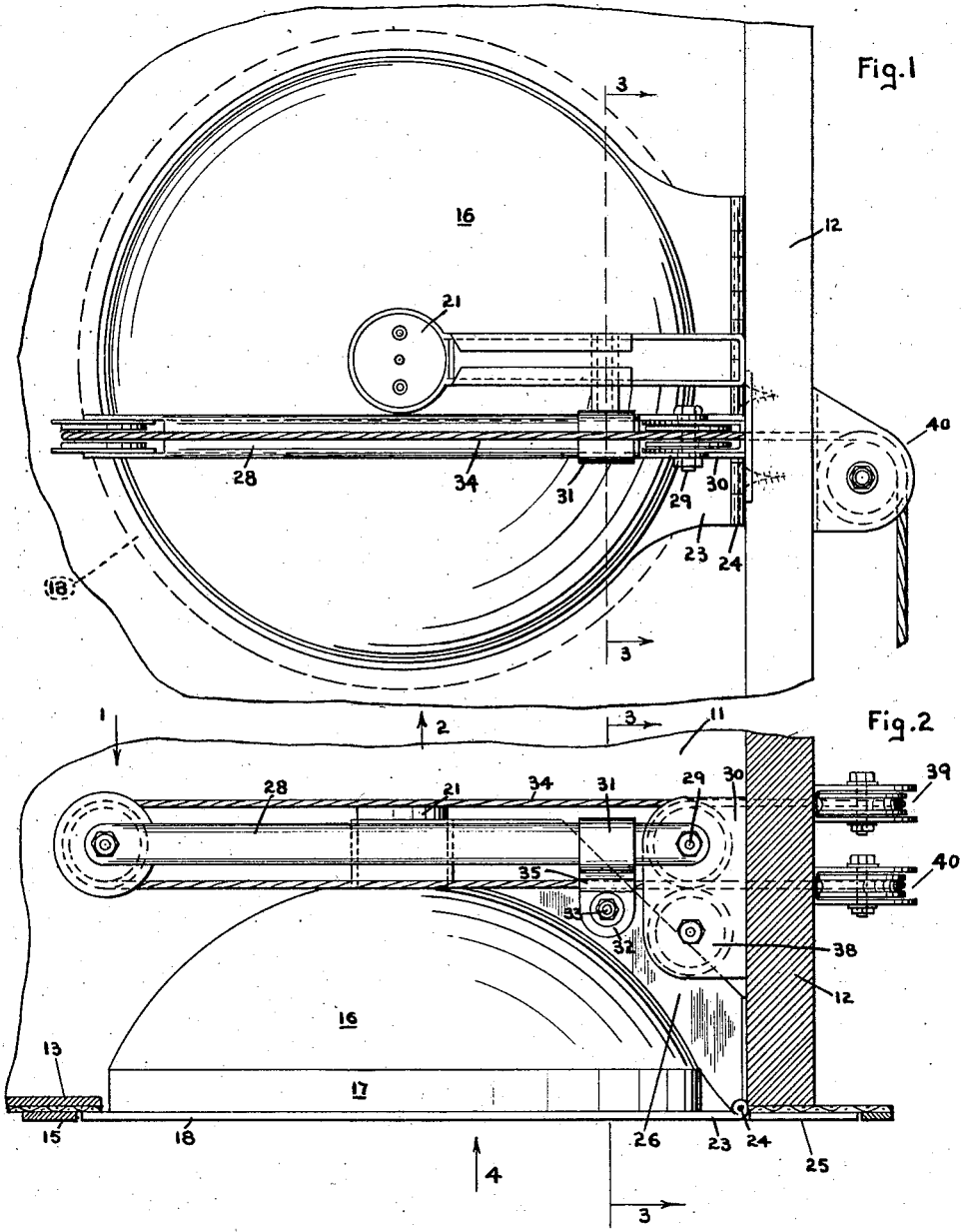

Inventor
Earl Van Horn
by Hazard and Miller
Attorneys

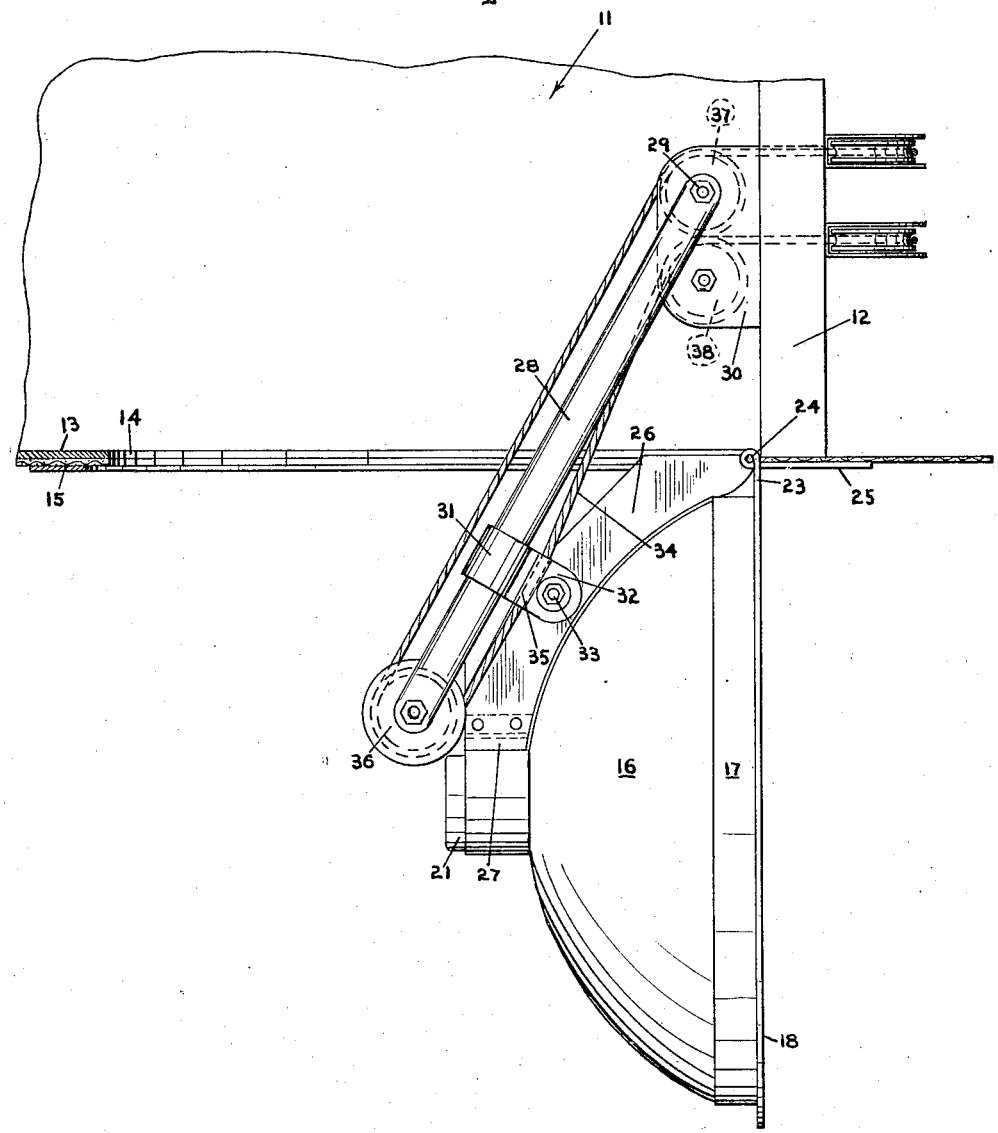

Patented May 12, 1931

1,804,572

UNITED STATES PATENT OFFICE

EARL VAN HORN, OF LOS ANGELES, CALIFORNIA, ASSIGNOR TO GOODYER'S INC., OF LOS ANGELES, CALIFORNIA, A CORPORATION OF NEVADA

AEROPLANE LANDING LIGHT

Application filed November 20, 1929. Serial No. 408,534.

My invention pertains to an aeroplane landing light of a type in which the lamp can be housed within the wing.

An object of my invention in an aeroplane landing light of the above mentioned type is a lamp and mounting therefor with lamp controls of such a construction that the lamp body may be housed in the wing with the glass or lens of the lamp being in alignment with a lower wing surface and in which the lamp may be swung downwardly in any desired angle to give an illumination directly ahead in the line of flight or in any desired downward angle between the angle normal to the lower wing surface or at right angles thereto.

Another object of my invention is having a pivotally mounted lamp housing so that the housing may be housed in the wing with the glass or lens being in alignment with the lower surface of the wing or in which the lamp may be swung on its pivot to have the glass or lens at right angles and depending from the lower wing surface, thus giving an illumination directly ahead.

Another object of my invention is in an aeroplane landing light having a cable control preferably by an endless type of cable which may be manipulated by a pilot, which cable operates a lever, the cable passing over a pulley on the lever. This lever has a sliding connection with the lamp housing and the cable is secured to the said connecting elements.

In this connection the lever is pivotally mounted and has the cable passing over a pulley on the end. On this lever there is a collar freely slidable, which collar is attached to the lamp housing. The cable also is attached to the connecting sleeve so that a pull on the cable in one direction tends to pull the sleeve outwardly on the lever, which action results in the lamp swinging on its pivot and the sleeve sliding outwardly. This action may be carried through until the lamp occupies a position depending from the wing and giving a straight ahead illumination. Operating the cable with a pull in the opposite direction tends to slide the sleeve inwardly on the lever, which action causes the upward swing of the lever and the inward sliding of the sleeve, this latter causing the lamp housing to be swung upwardly and housed within the wing. The cables may be locked in any suitable manner in the extremes of movement and thus hold the lamp either in the housed or in the fully exposed position.

My invention is illustrated in the accompanying drawings, in which,

Figure 1 is a plan taken in the direction of the arrow 1 of Fig. 2, that is looking down on the lamp housing and its operating mechanism from inside of the aeroplane wing, showing part of the wing construction in which the lamp is housed;

Fig. 2 is a side elevation taken in the direction of the arrow 2 of Fig. 1 of the lamp housing and its operating mechanism, showing part of the wing in longitudinal section;

Fig. 5 is an elevation similar to Fig. 2 with the lamp completely lowered for giving illumination directly ahead.

Figure 3:
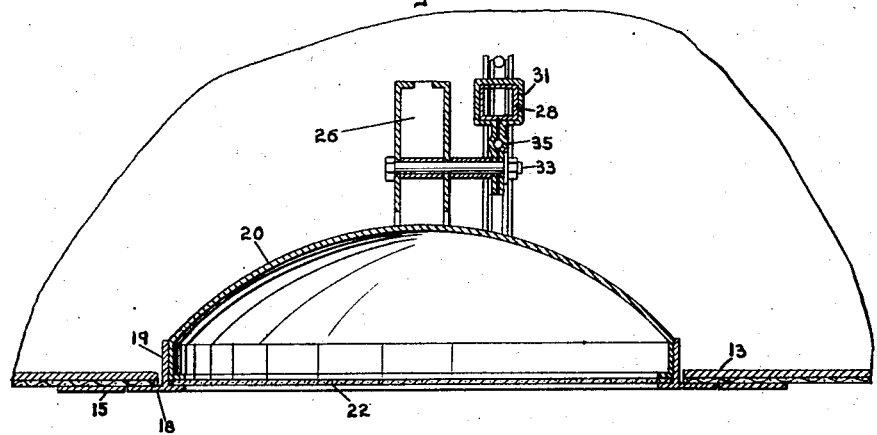
Fig. 3 is a vertical transverse section on the line 3—3 of Figs. 1 or 2 in the direction of the arrows.
Figure 4:
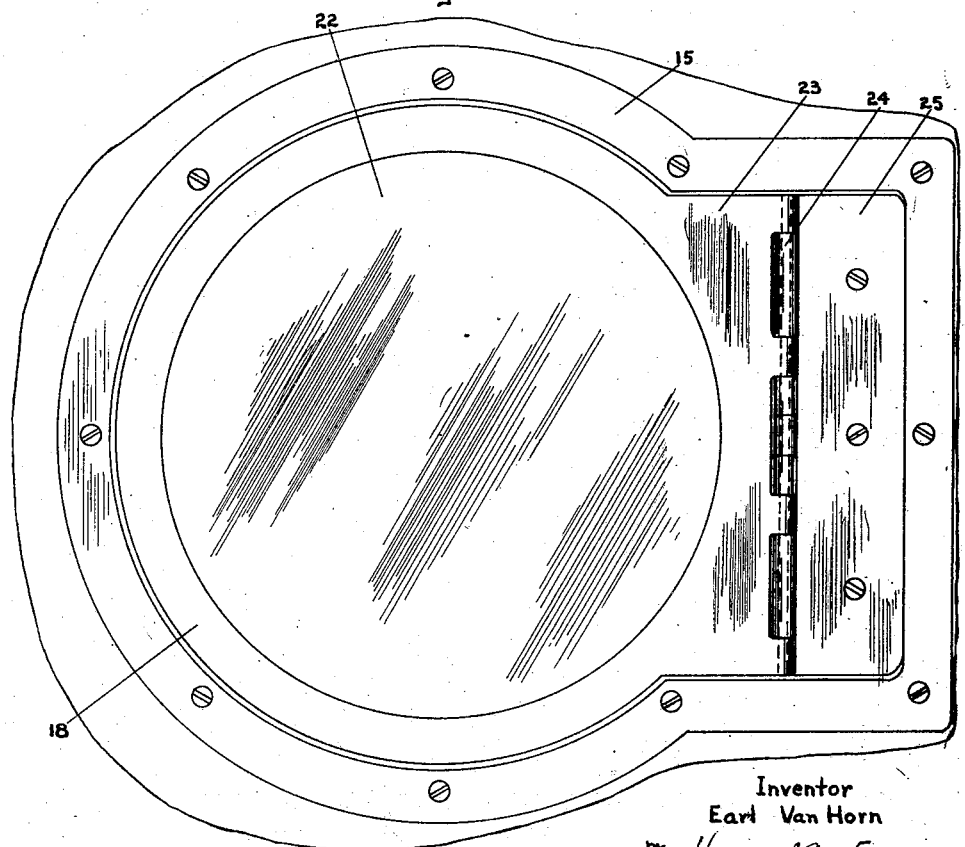
Fig. 4 is an underneath view taken in the direction of the arrow 4 of Fig. 2.

In the drawings, a section of an aeroplane wing is designated generally by the numeral 11, this having a beam 12 or the like built therein, such beam extending preferably outwardly and being located somewhere near the nose of the wing. The lower surface of the wing is indicated by the numeral 13; this having an opening 14 therein to accommodate the lamp. A ring 15 of metal surrounds such opening and the opening in the illustration is substantially circular.

A lamp designated generally by the numeral 16 has preferably an angular rim 17 which rim is illustrated as being T-shaped in cross section with a flange 18 to engage outside of the wing surface adjacent the ring 15 and having an upwardly extending stem 19. In this latter there is secured the reflector 20 which may be of any suitable character. At the base of the reflector there is a metal socket structure 21 in which the lamp bulb is mounted. A glass or lens 22 fits against the inside part of the flange 18 and a portion of the reflector which glass when the lamp is housed forms a supporting surface in substantial alignment with the lower surface of the wing.

The flange 18 has a continuation 23 which is connected by a hinge 24 to a fixed part 25 of the ring 15. There is a substantial brace member 26 illustrated as being hollow and also connected to the hinge 24. This brace member may be rigidly secured to the back of the reflector in any suitable manner. The brace is attached to the socket 21 as indicated at 27 by any suitable fastening means. Thus the brace and lamp swing on the hinge as a unit.

A lever arm 28 which is preferably formed of hollow metal is pivoted on a pivot pin 29, such pin being supported in a bracket 30 attached to the beam 12. Slidably mounted on the lever there is a sleeve 31, which sleeve is of the desired contour to fit and slide freely in the arm 28, this being shown rectangular in Fig. 3. The sleeve has an extension 32 which is connected to the base 26 by a bolt 33.

An endless cable 34 is fixedly connected as indicated at 35 to the sleeve, being attached adjacent the bolt 33. Such cable passes over a freely rotating pulley 36 mounted on the outer end of the lever and also has one part passing over a pulley 37 mounted in the bracket 30 and preferably rotating on the pivot pin 29. There is another pulley 38 also mounted in the bracket 30 which forms a lead for the other part of the cable. The runs of the cable pass through direction turnpulleys 39 and 40 (note Figs. 1, 2 and 5) which guide the runs of the cable into the fuselage of the aeroplane, such fuselage is not shown nor is the connection in the pilot cockpit.

The manner of operation and functioning of my invention is substantially as follows: Presuming first that the lamp is housed in the aeroplane wing as shown in Figs. 1 and 2, then as the cable is operated to exert a tension tending to pull the sleeve outwardly on the guide lever 28, as the sleeve cannot move out without a downward pivoting movement of the lamp and a downward swinging movement of the guide lever, such tension and the pulling of the cable causes the sleeve to shift from the position shown in Figs. 1 and 2, to the position shown in Fig. 5, in which the lamp has swung downwardly on its hinge 24 until the lens is normal to the lower surface of the wing. This enables a direct ahead illumination in alignment with the travel of the aeroplane. It will be obvious by stopping the movement of the lamp in any desired position, that the light may be inclined downwardly and forwardly of the wing at any desired angle. The cables may be locked in any desired manner so that when the lamp is fully out or extended, the forward pressure on the face of the lamp will not force it back into its housing.

When it is desired to house the lamp in the position of Fig. 5 the cable is tensioned in another direction tending to pull the sleeve 31 inwardly on the guide lever 28 which action causes an upward pull on the bracket 26 and hence moves the lamp upwardly into its housing at the same time returning the guide lever and the sleeve 31 to the original position shown in Fig. 2. When the lamp is fully housed the glass or lens being in alignment with the lower surface of the wing takes part of the lift and has no resistance to the forward motion. When the lamp is fully housed the cables may be locked if desired and thus hold the lamp in this housed position.

Various changes may be made in the principles of my invention without departing from the spirit thereof as set forth in the description, drawings and claims.

I claim:

1. A landing light comprising a pivotally mounted lamp housing having an enclosing lens, the pivotal connection being adapted for connection to a fixed part of an aeroplane, the lamp being enclosed in one position in the aeroplane passing in and out of an opening and adapted when enclosed to have the lens parallel to a lower surface, a pivotally mounted arm, a slidable connection between the arm and the housing, the arm being pivoted to a fixed part of the aeroplane, means to move the arm in an arcuate motion, the movement of the arm shifting the housing from a position enclosed in the aeroplane structure or to a position exposed with the lens in the second position substantially at right angles to that of the enclosed position.

2. A landing light comprising a lamp housing, means to mount said housing in an aeroplane structure, an arm pivotally mounted to a fixed part of an aeroplane, means forming a sliding connection between the arm and the housing, a tension exerting means connected to the means interconnecting the arm and the housing, said tension means being adapted when pulled in opposite directions to move the housing from a position enclosed in the aeroplane structure to an exposed position or vice versa.

3. A landing light comprising in combination a lamp housing, a pivotally connecting means to attach said housing to a fixed part of an aeroplane to pass in and out of an opening in the lower surface of said structure, a pivotally mounted arm, a slidable connection between the arm and the housing, a tension means passing along said arm and having a fixed connection to the housing, means to operate the tension means whereby the housing may be shifted from an enclosed to an exposed position or vice versa, the two positions being substantially at right angles one to the other.

4. A landing light comprising in combination a lamp housing, means for pivotally connecting said housing to part of an aeroplane to move in and out of an opening in the lower surface of a wing, a pivotally mounted arm, a sleeve slidable on the arm, means connecting the sleeve and the housing, a cable passing over the outer end of the arm and having a fixed connection to the sleeve, means to tension the cable in an opposite direction relative to the sleeve and thereby shift the housing from an enclosed to an exposed position or vice versa, said positions in the extreme movement being at substantially right angles one to the other.

5. A landing light comprising in combination a lamp housing, means to pivotally mount said housing on the structure of an aeroplane wing, the lamp housing having a cover lens adapted when housed to occupy a position substantially in alignment with the lower surface of the wing, the wing having an opening for the passage of the housing, an arm pivotally mounted in the wing having a pulley at its outer end, a sleeve slidably mounted on the arm and having a connection to the lamp housing, a cable connected to the housing and passing over the pulley on the end of the arm and extending in opposite directions, one lead passing over the pulley at the outer end of the arm, there being guide pulleys for both of the cable leads, the pull on the cable in one direction being adapted to swing the housing from a position enclosed in the wing to an exposed position and the pull in the opposite direction being adapted to swing the housing from an exposed position to a position enclosed in the wing.

6. A landing light having a pivotally mounted lamp housing with means adapted to pivotally connect said housing to an aeroplane structure, a sleeve connected to said housing, means to guide the sleeve in a rectilinear motion and means to exert forces in a rectilinear direction on the sleeve and in such action moving the sleeve in a rectilinear direction at the same time swinging the housing and the sleeve in an arcuate movement.

7. A landing light having a pivotally mounted lamp housing adapted to be pivotally connected to an aeroplane structure, said housing in one position being adapted to be removed from the air path of the aeroplane, a sleeve having a connection to the housing, a straight guide member for the sleeve, said guide member being pivotally mounted, means to exert forces in a rectilinear direction on the sleeve substantially parallel to the guide member, whereby the sleeve is given a rectilinear motion on the guide member and also an arcuate motion with the housing, the action of said forces swinging the housing on its pivot.

8. A landing light having a pivotally mounted lamp housing adapted for connection to an aeroplane, the housing having a lens, the housing having a pivoting motion to position the lens substantially in the plane of the direction of flight or substantially at right angles thereto, a pivotally mounted guide arm, an inter-connecting element between the guide arm and the housing, having a rectilinear motion with reference to the guide arm and an arcuate motion in regard to the pivot of the lamp housing, means to exert rectilinear forces on the said element, whereby said element moves longitudinally of the guide and at the same time has an arcuate motion with the lamp housing.

In testimony whereof I have signed my name to this specification.

EARL VAN HORN.